United States Patent
Teng et al.

(10) Patent No.: US 9,401,124 B2
(45) Date of Patent: Jul. 26, 2016

(54) RENDERING METHOD

(75) Inventors: Jun Teng, Beijing (CN); Li Xin Luo, Beijing (CN); Zhi Bo Chen, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 197 days.

(21) Appl. No.: 13/513,608

(22) PCT Filed: Dec. 4, 2009

(86) PCT No.: PCT/CN2009/001370
§ 371 (c)(1),
(2), (4) Date: Jun. 4, 2012

(87) PCT Pub. No.: WO2011/066673
PCT Pub. Date: Jun. 9, 2011

(65) Prior Publication Data
US 2012/0242679 A1    Sep. 27, 2012

(51) Int. Cl.
G09G 5/02 (2006.01)
G09G 1/28 (2006.01)
G09G 3/20 (2006.01)
G09G 3/36 (2006.01)

(52) U.S. Cl.
CPC .. *G09G 5/02* (2013.01); *G09G 1/28* (2013.01); *G09G 3/2003* (2013.01); *G09G 3/3607* (2013.01)

(58) Field of Classification Search
USPC ........................................................ 345/611
See application file for complete search history.

(56) References Cited

U.S. PATENT DOCUMENTS

| 8,224,109 B2* | 7/2012 | Bosco et al. ................... 382/260 |
| 8,374,457 B1* | 2/2013 | Wang et al. .................... 382/266 |
| 2007/0008556 A1* | 1/2007 | Kagawa et al. ................. 358/1.9 |
| 2007/0046686 A1* | 3/2007 | Keller ............................ 345/581 |
| 2007/0139432 A1* | 6/2007 | Anderson et al. ............. 345/582 |
| 2008/0030500 A1 | 2/2008 | Krishnan et al. |
| 2008/0152256 A1* | 6/2008 | Ou et al. ........................ 382/276 |
| 2009/0080526 A1* | 3/2009 | Vasireddy ............. G06T 7/2013 375/240.16 |
| 2009/0285504 A1 | 11/2009 | Li et al. |
| 2010/0020244 A1* | 1/2010 | Mitsuya et al. ............... 348/699 |

FOREIGN PATENT DOCUMENTS

JP    JP1153534    2/1999

OTHER PUBLICATIONS

Bolin, Mark R. etal, "Perceptually Based Adaptive Sampling Algorithm", In SIGGRAPH 98 conference Proceedings, 1998, pp. 299-309.
Ramasubramanian, Mahesh etal, "A Perceptually Based Physical Error Metric For Realistic Image Synthesis", Proceedings of the 26th annual conference on computer, 1999, pp. 73-82.
Search Report Dated Sep. 16, 2010.
Kajiya, James T., "The Rendering Equation", SIGGRAPH, vol. 20, No. 4, Aug. 1986, Dallas Texas, pp. 143-150.

* cited by examiner

*Primary Examiner* — Ming Hon
*Assistant Examiner* — Yu-Jang Tswei
(74) *Attorney, Agent, or Firm* — Tutunjian & Bitetto, P.C.

(57) ABSTRACT

As to enhance the rendering while minimizing needed computation time, the method comprises the steps of determining noise information, said noise information being representative of noise level estimated for at least a part of said image; the noise information being determined for the achromatic component of the image; sampling said part of the image according to said noise information; and rendering said at least a part of the image according to said sampling.

7 Claims, 6 Drawing Sheets

RENDERING METHOD

This application claims the benefit, under 35 U.S.C. §365 of International Application PCT/CN2009/001370, filed Dec. 4, 2009, which was published in accordance with PCT Article 21(2) on Jun. 9, 2011 in English.

1. FIELD OF THE INVENTION

The present invention relates to the field of synthesis image rendering in two or three dimensions. The invention is also related to the context of special effects for a real-time (or live) rendering

2. TECHNOLOGICAL BACKGROUND

Image synthesis is the final production stage of computer graphics image (CGI) related industry. The quality of images generated by computer graphics software (renderer) is crucial to cartoon animation film, TV program, and Visual effect (VFX) generation.

As illustrated on FIG. 1, ray tracing is the universal algorithm used to generate synthesized images. Rays are generated and shot from the view point. If a ray intersects an object in the scene, the color value at the intersection point is calculated, and the corresponding pixel value in image plane is set accordingly.

However, this simple ray tracing algorithm generates aliased image due to the lack of samples. Monte Carlo ray tracing algorithm is thus used to solve the aliasing problem. In a Monte Carlo ray tracing system, multiple samples (multiple rays) are generated and shot into the scene for each pixel, and the filtered color value is used as the pixel value.

Monte Carlo ray tracing algorithm is used by production quality render (Mental ray) to generate synthesized images in films and TV programs. In Monte Carlo ray tracing software, Monte Carlo integral is used to solve the rendering equation [see Kajiya, James T. (1986), "The rendering equation", SIGGRAPH 1986] numerically (Equation 1).

$$L(x \rightarrow \Theta) = L_e(x \rightarrow \Theta) + \int_\Omega f_r(x, \psi \leftrightarrow \Theta) L_i(x \rightarrow \psi) \cos(N, \psi) d\omega \quad (1)$$

As illustrated on FIG. 2, the Monte Carlo integral converges to the true value using infinite samples, but with finite number of samples, variance always exists as noise in the synthesized image.

Improving the number of samples reduces the noise in a synthesized image, but with more computation cost. In ambient occlusion algorithm, shadow algorithm, and area lighting algorithm, the noise in synthesized images is reduced by increasing the number of samples per pixel.

There is lack of quality metric for synthesized images, especially for Monte Carlo ray traced images. The quality of a synthesized image is determined subjectively normally, and the number of samples per pixel used to generate "good quality" images is determined by user's experience, which is always conservatively estimated, with the penalty of costly and unnecessary computation. This situation impedes the cost of CGI's production time.

There are some research works targeting at the "perception based rendering". In Mahesh Ramasubramanian, S. N. Pattanaik, Donald P. Greenberg, "A Perceptually Based Physical Error Metric for Realistic Image Synthesis", SIGGRAPH 1999, human perception model is used to predict the quality metric, and this metric is used in recursive type global illumination rendering algorithms. However, the quality metric is only calculated from direct illumination rendering result, the quality metric for final rendered image is not considered in their work.

The rendering systems of the state of the art do not take noise artifact detection into consideration. The noise artifact detection and reduction are performed based on the experience of artists. The conservative estimation of samples per pixel always leads to rendering computations more than necessary.

3. INVENTION SUMMARY

The invention is aimed at alleviating these drawbacks of the prior art.

More particularly, the objective of the invention is notably to enhance rendering while minimizing needed computation time and/or computation resources.

For this purpose, the invention proposes a method for rendering an image, the method comprising the steps of
  determining at least a noise information, the at least a noise information being representative of at least a noise level estimated for at least a part of the image;
  sampling the at least a part of the image according to the at least a noise information; and
  rendering the at least a part of the image according to the sampling.

Advantageously, the method comprises the step of representing the at least a noise information on the image.

According to different variants of the invention, the at least a noise information is represented in a graphical way.

According to advantageous embodiments, the at least a part of the image is oversampled if the at least a noise information is more than a threshold value.

According to a specific feature, the method comprises a step of requesting the determining of the at least a noise information.

Advantageously, the method comprises a step of requesting the sampling of the at least a part of the image.

According to different variants of the invention, the method comprises a step of requesting the rendering of the at least a part of the image.

According to advantageous embodiments, the image is divided into a plurality of blocks of pixels, the at least a noise information being determined for each block of the image.

4. LIST OF FIGURES

The invention will be better understood, and other features and advantages will become apparent from reading the description that follows, the description referring to the appended drawings in which.

5. DETAILED DESCRIPTION OF THE INVENTION

Invention will be described with reference to a specific embodiment of a rendering system that supports noise level detection and measurement of the synthesized image. This rendering system provides user with visual feedback of the noise artifact of the synthesized image. The user can query the noise artifact metric of synthesized image, and can also indicate the render to refine the synthesized image. The noise level representation and calculation method used according to the specific embodiment is called "adaptive sample map", this map serves notably two purposes: user can judge the noise level of the synthesized image visually, and noise level measure can be generate from this image easily; and render can use this map to generate samples for each pixel in block level adaptively.

The render takes advantage of the information stored in adaptive sample map for recursive refining synthesized image. The samples per pixel are generated adaptively according to noise level, and rendering cost is cut effectively.

The rendering system according to a specific embodiment, e.g. a Monte Carlo rendering system, supports noise level detection and measurement of the synthesized image. The noise level representation is called "adaptive sample map". This map is generated from synthesized image automatically. The adaptive sample map is generated by mapping noise value in synthesized image to number of samples per pixel that used to reduce the noise. Large noise value maps to large samples number. Noise value maps to number of samples in a block basis.

A user interface is provided for a user to take a decision when a synthesized image is generated. The user can
- query the noise artifact level, which is calculated from the adaptive sample map,
- indicate the render to refine the synthesized image, the render generate samples per pixel adaptively, the number of samples is stored in adaptive sample map.

Figure 1:
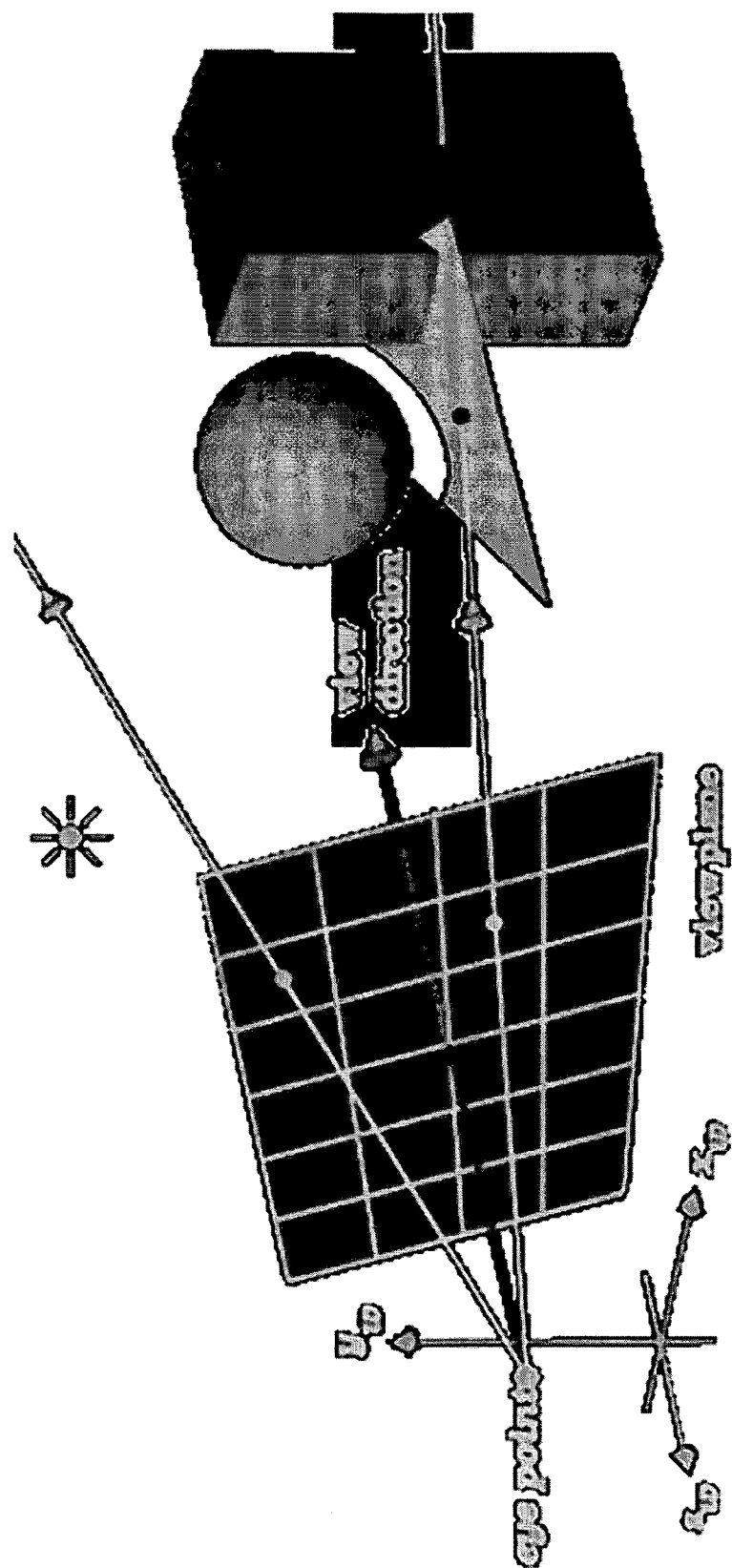
FIG. 1 represents a method for generating synthesis images according to the state of the art.
Figure 2:
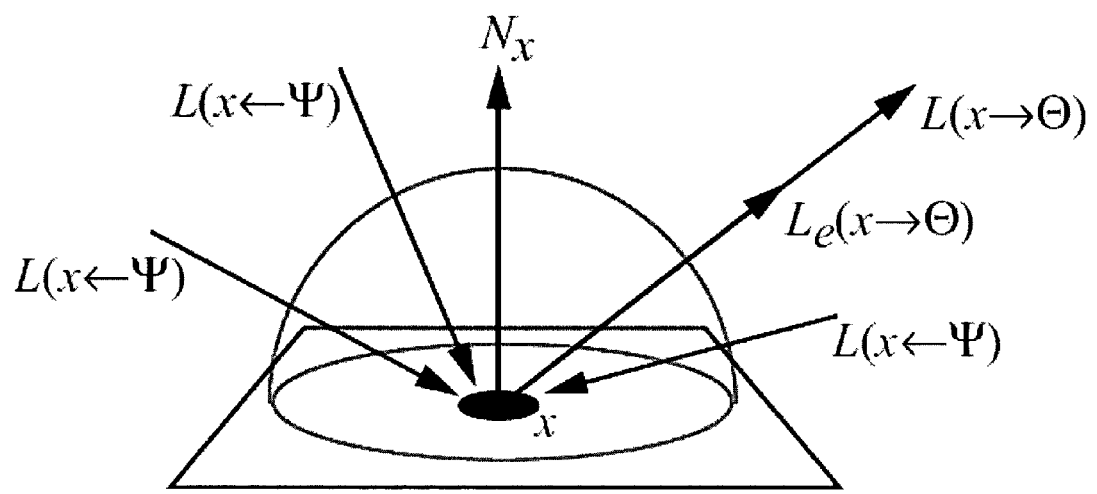
FIG. 2 represents a rendering equation according to the state of the art.
Figure 3:
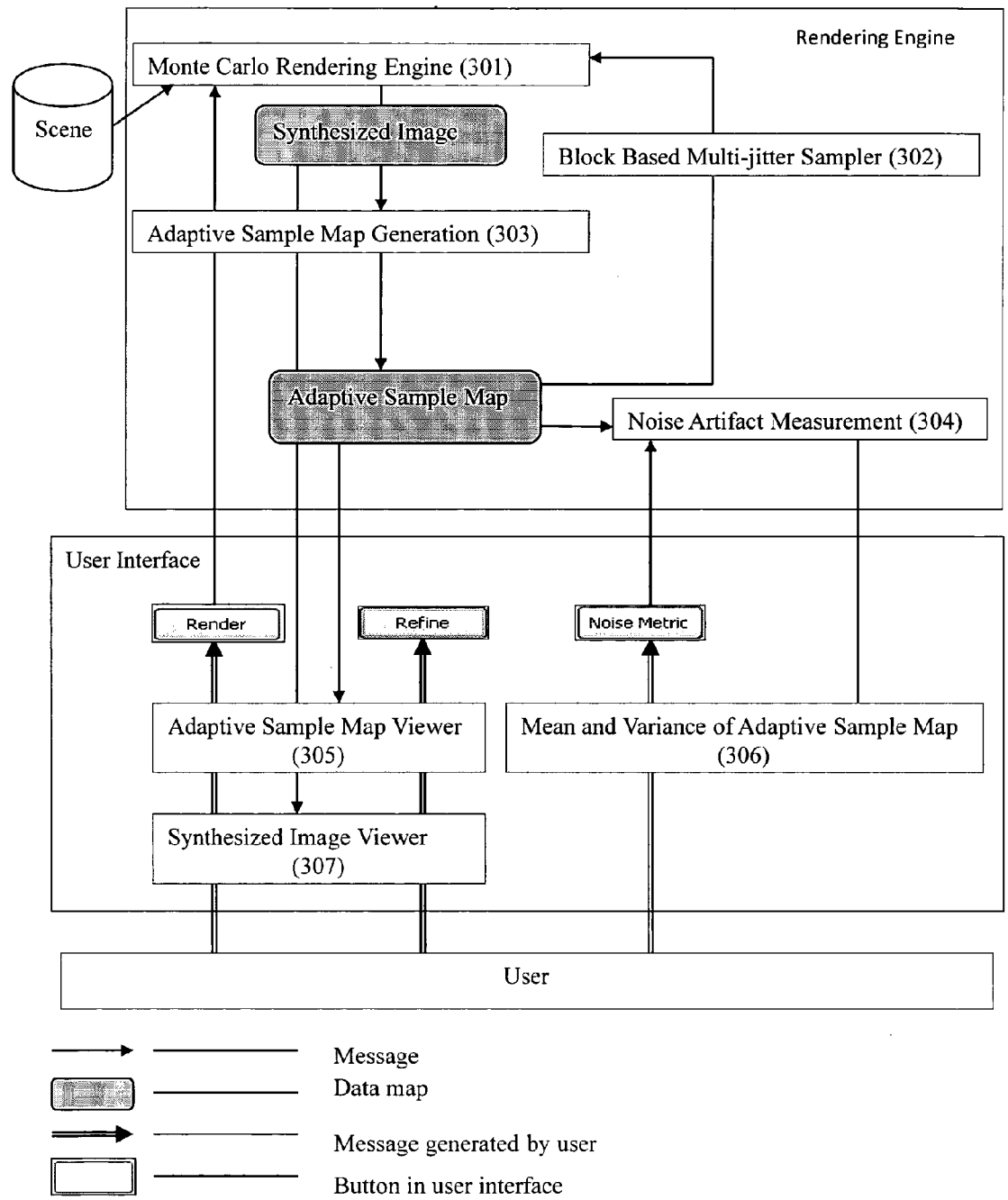
FIG. 3 represents a diagram of a rendering system, according to a specific embodiment of the invention.

FIG. 3 illustrates a rendering system architecture, for example a Monte Carlo rendering system architecture according to a particular embodiment of the invention.

The Monte Carlo Rendering Engine (block 301) generates a synthesized image, and then the Adaptive Sample Map Generation component (block 302) detects the noise artifact in this image and generates an "Adaptive Sample Map", which is the noise level representation for synthesized image. The synthesized image and its corresponding adaptive sample map are displayed by Synthesized Image Viewer (block 307) and Adaptive Sample Map Viewer (block 305).

The user can judge the synthesized image's noise quality from adaptive sample map directly. The user can take further steps to
- Instruct the rendering engine to refine the synthesized image, Block Based Multi-jitter Sampler (block 302) generates samples per pixel from the adaptive sample map, and these samples are used by Monte Carlo rendering engine for ray tracing.
- Get the noise artifact metric, Noise Artifact Measurement (block 304) calculates the mean and variance values of adaptive sample map, and these values are shown to user by Mean and Variance of Adaptive Sample Map (block 306) component.

Figure 4:
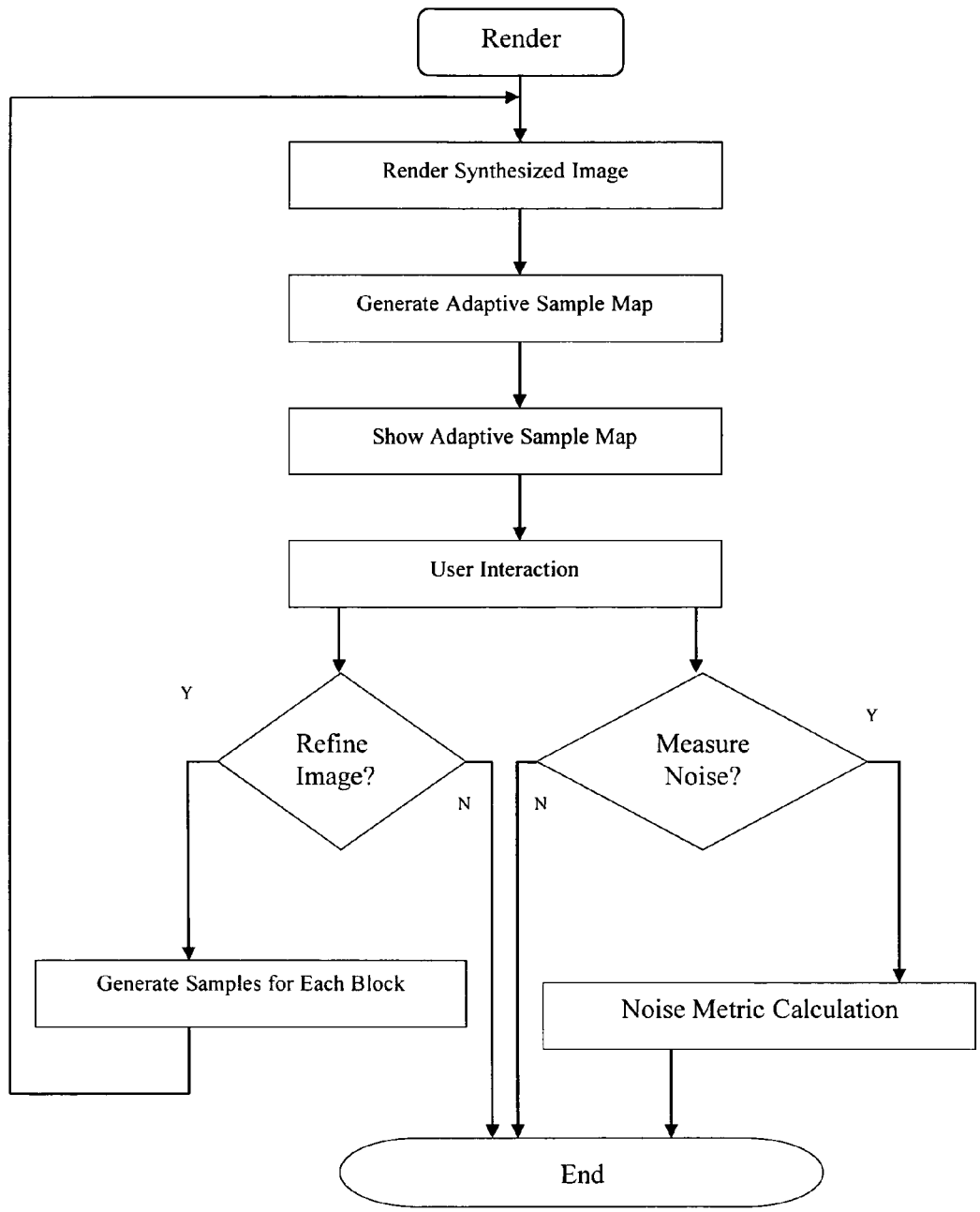
FIG. 4 represents a flowchart of a rendering method, according to a specific embodiment of the invention.

The user input instructions from user interface, and these instructions are sent to rendering engine for performing corresponding operations. The flowchart of rendering system is shown in FIG. 4. A Monte Carlo ray tracing system that integrated with noise level detection and representation components. The noise level detection and representation components use "adaptive sample map" for noise level representation. A method for noise representation and measurement called "adaptive sample map" is implemented, this map being calculated from the original synthesized image by an algorithm. The system reports the noise level calculated from "adaptive sample map" to the user for noise artifact metric. The system refines the synthesized image using samples generated from "adaptive sample map" for adaptive sampling of each pixel. A user interface adapted for user to input instructions for synthesized image refinement, or query the noise level metric is provided.

Figure 5:
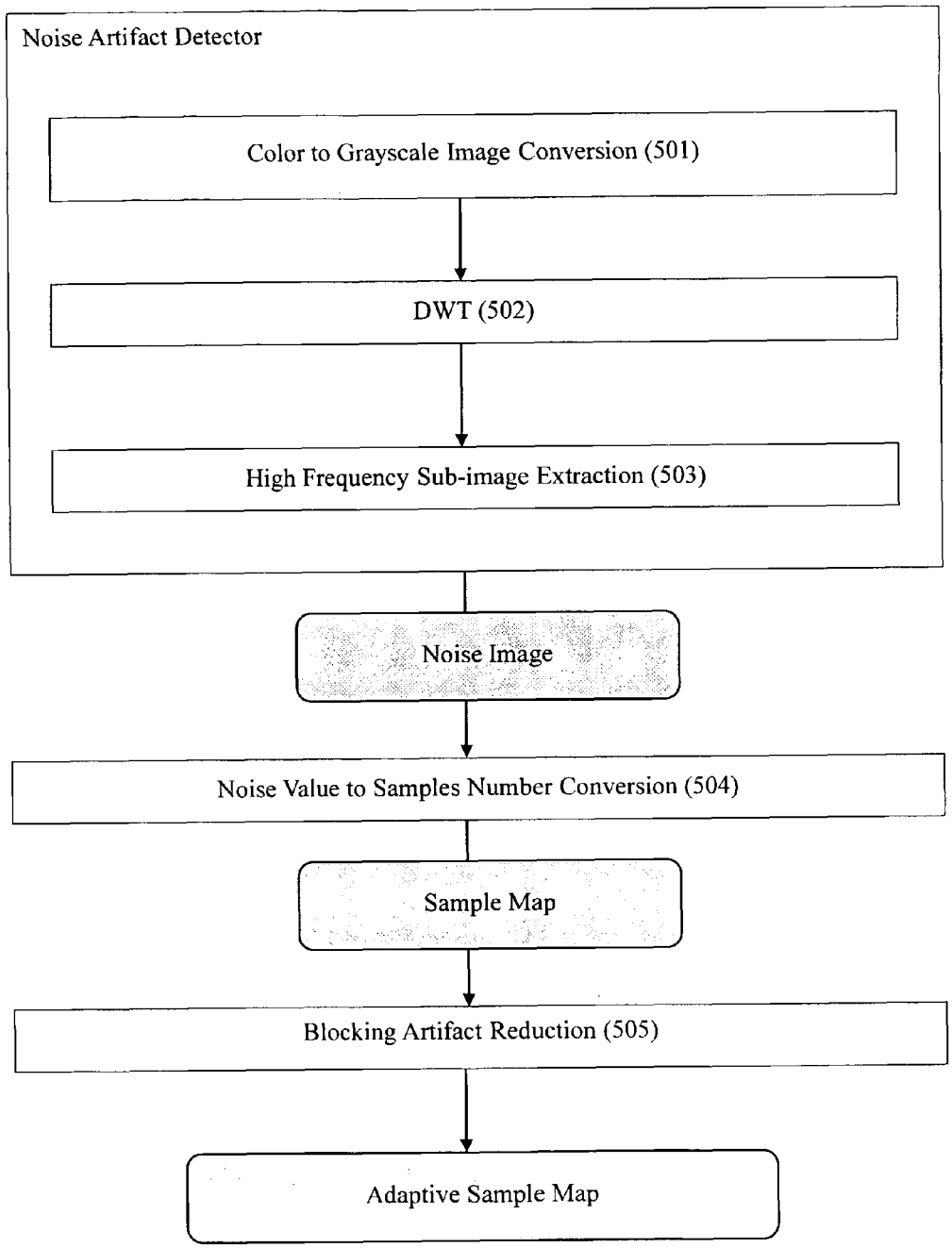
FIG. 5 represents a diagram of an adaptive map generation component, according to a specific embodiment of the invention.

FIG. 5 illustrates a diagram of Adaptive Sample Map Generation component, corresponding to block 303 of FIG. 3 for noise detection and adaptive sample map generation, according to a particular embodiment of the invention.

The noise detection is performed in grayscale images. Block 501 transforms the original synthesized image into grayscale image, the RGB to YCbCr colour space is used for this purpose. The noise in synthesized image is the type of salt-and-pepper noise, which can be manipulated efficiently and robustly with grayscale images.

The grayscale synthesized image is then subdivided into n×n blocks, for example 8×8 blocks or 12×12 blocks or 16×16 blocks, the discrete wavelet transformation is performed on each block, and the transformed highest frequency sub-image in the diagonal direction encodes the noise information, this image is used as a noise map. Block 502 performs Discrete Wavelet Transform (DWT) on grayscale image, and block 503 extracts the diagonal sub-image of the DWT result as noise map.

Block 504 maps the noise value in each block to the number of samples that is sufficient for reducing the noise below perceivable threshold. The mapping equation is shown in Equation 2, this mapping equation conforms Gaussian distribution. The mapped image is shown, each pixel in this image corresponds to the sample number used to reduce the noise artifact.

Sample_Number=20·exp(−((noise_value−max_noise_value)$^2$/max_noise_value)·ln 5) tm Equation (2)

According to a particular embodiment, the max_noise_value is set to 20, which is safe for generating perceptually satisfied rendered images.

If adjacent blocks takes different samples number, blocking artifact in rendered image will appear, which is similar to blockness artifact caused by video and image compression methods. Thus block 505 is used to reduce the locking artifact among blocks. A Gaussian filter is used to smooth the sample map, which is described in Equation 3

$$G(x, y) = \frac{1}{2\pi\sigma^2} e^{\frac{x^2+y^2}{2\sigma^2}} \quad (3)$$

According to one experiment, the kernel size is chosen as 3, and the σ is calculated according to Equ. 4

$$\sigma=(n/2-1)\times 0.3+0.8 \quad (4)$$

The result of block 505 is the adaptive sample map, which represents the noise level in the original synthesized image.

Figure 6:
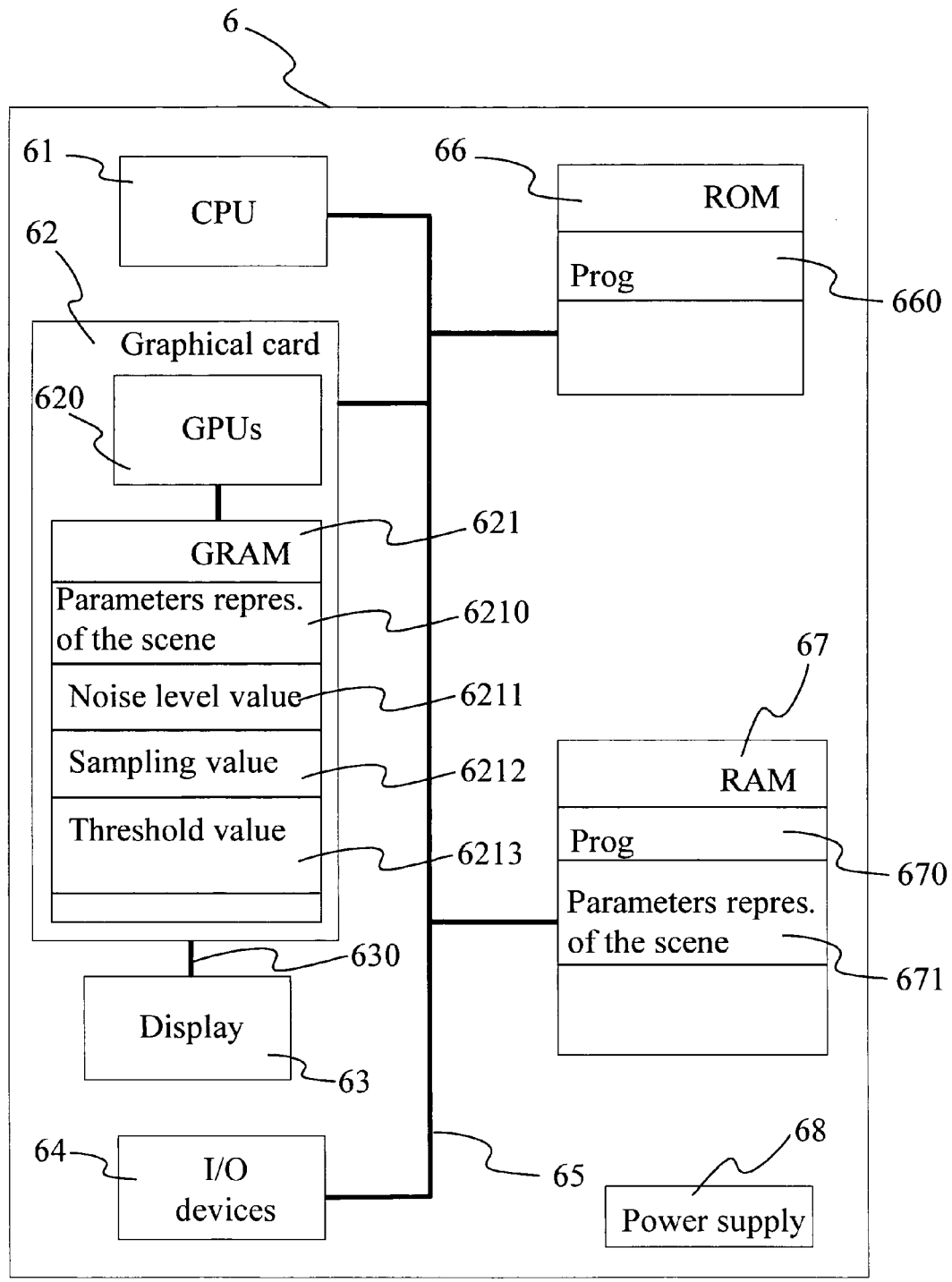
FIG. 6 represents a rendering engine of the rendering system illustrated on FIG. 3, according to a specific embodiment of the invention.

FIG. 6 illustrates schematically a material embodiment of a device 6 adapted for rendering an image. Device 6 corresponds for example to the rendering engine of FIG. 4.

The device 6 comprises following elements, connected with each other via an address and data bus 65, which also transports a clock signal:
- a CPU 61;
- a graphical card 62 comprising:
  - several graphical processing units 620 (GPUs);
  - a Graphical Random Access Memory GRAM 421;
- a non volatile memory 66, for example a Read Only Memory (ROM);
- a Random Access Memory (RAM) 67;
- one or several I/O devices (Input/Output devices) 64, such as a keyboard, a mouse, a webcam for example; and
- a power supply unit 68.

The device 6 also comprises a display device 63, such as a display screen directly connected to the graphical card 63 for notably rendering synthesis images computed and composed in the graphical card, for example in real time. According to an embodiment, the display device is external to the device 6.

One can note that the word « register » used in the description of memories 62, 66 and 67 is related to a low capacity memory area as well as a large capacity memory area.

When switched on, the CPU 61 uploads the program 660 in the RAM and executes the corresponding instructions.

RAM 67 comprises:
- in a register 430, the program executed by the CPU 61 and uploaded after switch on of the device 6;
- parameters 671 representative of a scene.

Algorithms implementing the steps of the invention related methods are stored in the memory GRAM 67 of the graphical card 62 associated to the device 6. When switched on and once the parameters 670 uploaded in RAM 47, GPUs 620 of the graphical card 62 load these parameters in GRAM 621 and run instructions of these algorithms under the form of microprograms such as shader using HLSL language (High Level Shader Language), GLSL language (OpenGL Shading language) for example.

The memory GRAM 621 notably comprises:
- in a register 6210, the parameters representative of the scene;
- noise level values 6211 of the image representing the scene;
- sampling values 6212 representative of the numbers of samples for rendering at least a part of the image;
- threshold values 6213.

Of course, the invention is not limited to the embodiments described above.

The invention is not limited to a rendering method but also concerns any device implementing such a method, and notably any device comprising at least a GPU.

Advantageously, the rendering method implements a Monte Carlo method or a Metropolis-Hastings method (or algorithm) known as Metropolis light transport method The invention is also related to a method for compositing a video image, 2D or 3D.

The present invention can be used in application for video games for example or any application using synthesis images.

The invention claimed is:

1. A method for rendering a first image, wherein the method comprises:
   - dividing the first image in a plurality of first blocks of pixels;
   - determining, by at least a processor, a noise information for each first block of pixels, said noise information being representative of at least a noise level determined for said each first block, the noise information being determined for an achromatic component of the first image;
   - displaying said noise information in second blocks of pixels of on-a second image in a graphical way, each first block of pixels corresponding to one of the second blocks of pixels, the second image being different from the first image;
   - sampling, by said at least a processor, said each first block of pixels of the first image according to the noise information displayed in the second block of pixels corresponding to said each first block, the sampling of said each first block of pixels being requested based on the noise information, said each first block of the first image being oversampled when said noise information is more than a threshold value; and
   - rendering, by said at least a processor, said first image according to said sampling.

2. The method according to claim 1, further comprising requesting the determining of said noise information.

3. The method according to claim 1, further comprising requesting the rendering of said first image.

4. A non-transitory computer readable medium comprising instructions of program code for executing steps of the method according to claim 1, when said program is executed on a computer.

5. A device configured for rendering a first image, the device comprising:
   - a memory;
   - a processor configured to:
     - divide the first image in a plurality of first blocks of pixels;
     - determine a noise information for each first block of pixels, said noise information being representative of at least a noise level determined for said each first block, the noise information being determined for an achromatic component of the first image;
     - display said noise information in second blocks of pixels of second image in a graphical way, each first block of pixels corresponding to one of the second blocks of pixels, the second image being different from the first image;
     - sample said each first block of pixels of the first image according to the noise information displayed in the second block of pixels corresponding to said each first block, the sampling of said each first block of pixels being requested based on the noise information, said each first block of the first image being oversampled when said noise information is more than a threshold value; and
     - render said first image according to said sampling.

6. The device according to claim 5, wherein said processor is further configured to request the determining of said noise information.

7. The device according to claim 5, wherein said processor is further configured to request the rendering of said first image.

* * * * *